Feb. 13, 1951     B. F. McGOVERN     2,541,659
APPARATUS FOR THE INSPECTION OF TIRE TREADS
Filed Oct. 5, 1946
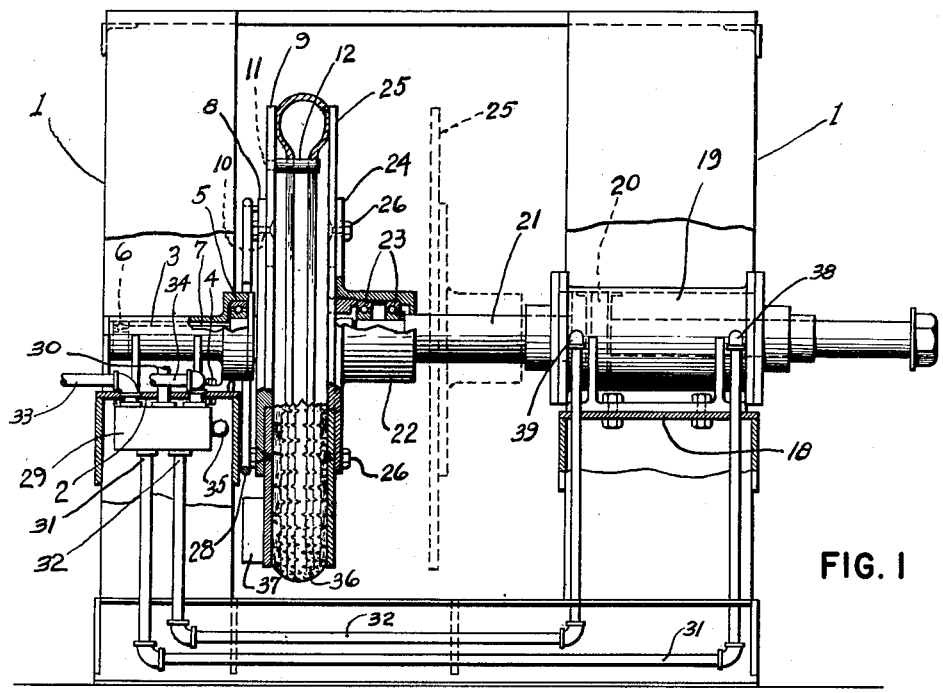
FIG. 1
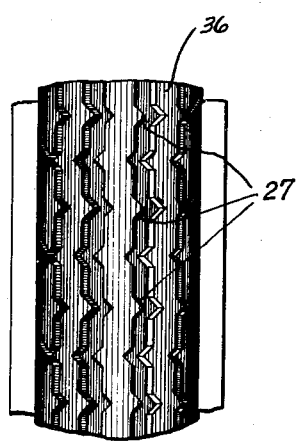
FIG. 3
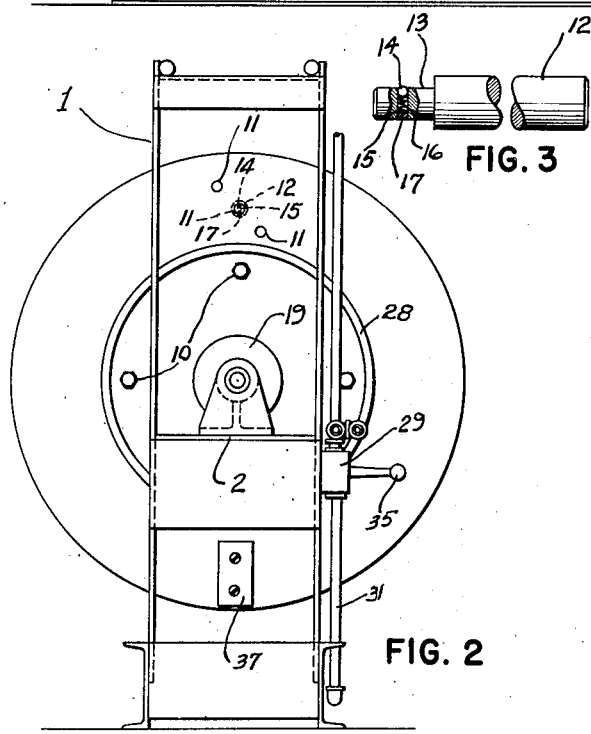
FIG. 2
FIG. 4
INVENTOR.
Bernard F. McGovern
BY
ATTORNEY Patented Feb. 13, 1951

2,541,659

UNITED STATES PATENT OFFICE 2,541,659

APPARATUS FOR THE INSPECTION OF TIRE TREADS

Bernard F. McGovern, Akron, Ohio, assignor to Wingfoot Corporation, Akron, Ohio, a corporation of Delaware Application October 5, 1946, Serial No. 701,474

3 Claims. (Cl. 254—50.3)

This invention relates to a device used in inspecting tires and more particularly to the inspection of the tread or ground contacting portion of tires.

The invention relates to the inspection of tire treads of various forms and sizes but is of especial utility for the inspection of the treads of tires used on trucks, tractors, busses and those used on earth-moving machinery or the so-called off-the-road tires; in fact, any tires provided with treads composed of projections and depressions serving as traction or non-skid elements. These projections may be of continuous circumferential ribs or of individual buttons of various form and design. When removing tires of this character from a mold considerable force is used to free them, especially the tread portion. In carrying out this operation, cracks or tears may sometimes appear at the base or sides of the projections causing a defective tread which may go undetected unless the tread portion of the tire is distorted.

The larger tires such as used on trucks and the like are formed of many plies of fabric. Such tire carcasses are quite stiff, requiring considerable force to manipulate and compress so that the tread portion may be stretched or otherwise distorted to reveal any cracks or defects that may be concealed therein.

An object of the present invention is to provide a device which will manipulate a tire by supporting the tire and compressing the sidewalls thereof toward one another. This will cause the tread to become distorted and stretched so that the tread portion will form a narrower arc than when in its normal form. This compression will create tension in the tread which will reveal any defects that may be hidden therein.

Another object of the invention is that less manual effort is requested when inspecting tire treads on a device of this character. The truck size tires are of considerable weight and may be rolled into and out of the device without the necessity of being lifted bodily.

The aforesaid objects of the invention, and other objects which will become apparent as the description proceeds, are achieved by providing a device which employs a pair of plates or discs between which a tire is supported, said discs being capable of distorting the supported tire to cause the tread portion to be under a tensional strain so that concealed defects therein will be exposed to view.

For a better understanding of the invention reference should be had to the accompanying drawings wherein one embodiment of the invention is illustrated. In the drawings Fig. 1 is a side elevation of the apparatus.

Fig. 2 is an end view of the apparatus.

Fig. 3 illustrates an enlarged view of the removable tire support with parts broken away.

Fig. 4 is a fragmentary view illustrating a tire tread under distortion.

With specific reference to the form of the invention illustrated in the drawing, the numeral 1 indicates generally a frame composed of structural steel, one side of which is provided with a seat 2 upon which a bearing 3 is mounted and attached thereto by the bolts 4. Ball bearings 5 and 6 are mounted in the bearing 3 and receive a shaft 7, the inner end of which is provided with a flange 8 on which is removably mounted a disc or plate 9 attached thereto by the bolts 10. The disc 9 is provided with drilled holes 11 to receive a removable tire support 12. The holes 11 are spaced at different radii with regard to the central axis of rotation of said disc to provide for the centering of various sizes of tires with respect to said disc so that the tread portions of tires will be concentric with the outer circumference of the disc.

The tire support 12 (see Fig. 3) is provided with a reduced portion 13 to engage the holes 11 in the disc 9. The tire support 12 is retained in said holes 11 by a steel ball 14 held in frictional engagement against the inner surface of the holes 11 by a spring 15, said ball and spring 15 being retained in an opening 16 in the support 12 by the plug 17.

At the other side of the structural steel frame 1 a seat 18 supports a double acting cylinder 19 having disposed therein a two-way piston 20 having a piston rod 21 attached thereto. The piston rod projects from cylinder 19 and has a hub 22 mounted thereon, said hub having ball bearings 23 mounted therein to provide free rotation of the hub on said piston rod. The hub 22 is provided with a flange 24 to which is attached a removable disc 25 by the bolts 26.

Through the action of the piston 20 within the cylinder 19, the disc 25 is caused to move axially toward and away from the afore-mentioned disc 9 whereby the discs contact the sides of a tire to compress same, and distort the tread portion so that any defects therein will be readily detected, after which the disc is caused to recede to release the tire.

The cracks usually appear at the base of the projecting portions of the tread as illustrated at 27 (see Fig. 4).

Tires are inspected soon after being taken from the molds in which they are vulcanized and are quite hot. While the inspection is in progress the tires are slowly revolved by hand. To avoid the discomfort of contact of the operator's hands on the hot tire, a handwheel 28 is attached to the flange 8 whereby the tire may be revolved or stopped at will.

To actuate the piston 20 within the cylinder 19 a single plunger control valve 29 is employed. This valve is a commercial article, therefore its operation only will be explained herein.

The valve 29 is provided with a fluid conducting inlet 30 which is connected to a suitable source of supply under pressure. Fluid conducting outlets 31 and 32 extending to either side of the cylinder 19, exhaust conduits 33 and 34 extending to a drain. A hand operating lever 35 is provided for directing the flow of fluid through the valve.

The operation of the invention is quite simple and consists of the following steps.

A tire 36 is rolled into the apparatus between the discs 9 and 25, the handwheel 28 is manipulated so that the support 12 engages the bead of a tire. By revolving the disc 9 to which the tire support is attached, the tire support is raised to its uppermost position thereby bringing the supported tire into concentric relationship with the discs 9 and 25. In order to provide balance for the disc 9 and to compensate for the weight of the tire support 12 a counterweight 37 is employed.

When a tire is properly positioned between the discs 9 and 25, the valve operating lever is shifted to the right, this connects inlet 30 with outlet 31 closing exhaust 33 and additionally interconnecting outlet 32 with exhaust 34. This will direct fluid under pressure through conduit 31 and through the cylinder inlet 38 which will actuate the piston 20 and cause the disc 25 to move toward the disc 9 to compress the tire. When the tire is compressed approximately 20% of its width, the hand lever 35 is shifted to mid-position which closes the inlet, outlets and exhausts and holds the tire in a compressed form for inspection of the tread portion.

The operator then slowly revolves the tire to inspect the tire tread. When the inspection is completed the lever 35 is shifted to the left which connects inlet 20 to outlet 32 and closes exhaust 23 at the same time connecting outlet 21 with exhaust 33.

With the valve set in this position, the disc 25 is caused to recede as indicated by dotted lines, fluid under pressure passing through the conduit 32 and entering the other side of the cylinder 19 through the cylinder inlet 39. The inspected tire may now be removed and another tire positioned on the support.

It will be noted that the valve 35 has three positions of the lever. With the lever in either extreme one side of the double acting cylinder 19 is open to pressure with the opposite end open to exhaust. Both the supply to the cylinder and the exhausts are closed when the handle is in mid-position.

While in accordance with the patent statutes, one best known embodiment of the invention has been illustrated and described in detail, it is to be particularly understood that the invention is not limited thereto or thereby, but the inventive scope is defined in the appended claims.

I claim:

1. A device for use in inspecting the treads of tires comprising a frame, one side of which supports a bearing having a shaft extending therefrom, a flanged attached to the inner end of said shaft, a demountable disc attached to said flange in concentric relationship, said disc having a series of openings drilled therein in staggered relationship and capable of receiving a removable pin for supporting a tire, a counterweight attached to said disc diametrically opposite said pin openings to position the pin in its uppermost position when mounting a tire thereon, the other side of the frame having mounted thereon a fluid pressure cylinder having a double acting piston employed therein, a piston rod attached to said piston and extending from said cylinder, a bearing mounted on the end of said piston rod, a circular integral flange extending from said bearing, a demountable circular disc attached to said flange in concentric relation, a valve means, a fluid conducting means connecting said valve to said cylinder, the valve being capable of manipulation to permit fluid under pressure to actuate the piston within the cylinder, whereby one of said discs may be moved toward and away from the other disc to permit the manipulation and inspection of a tire tread and means to revolve said tire.

2. A device for supporting and manipulating a tire carcass so that the tread portion may be inspected comprising a pair of circular discs, one of said discs having a tire support mounted thereon and a counterweight for positioning said tire support, the other disc being attached to the end of a piston rod, said piston rod being actuated by a double acting piston within a fluid pressure cylinder to cause the disc to move axially toward and away from the first mentioned disc by the manipulation of a valve, said valve having fluid pressure connection to said cylinder and means for revolving said discs.

3. A device for positioning and manipulating a pneumatic tire for inspecting the tread portion thereof comprising a pair of revolving discs mounted on bearings in opposed relationship, one of said discs being stationary with respect to axial movement, said disc having a support for a tire removably mounted thereon and a counterweight to position said support, the other disc being mounted on a bearing which is attached to one end of a piston rod, said piston rod being actuated axially by a piston within a fluid pressure cylinder, said cylinder being connected to a valve the manipulation of which will cause said tire to be compressed for inspection and released after inspection.

BERNARD F. McGOVERN.

REFERENCES CITED

The following references are of record in the file of this patent:

UNITED STATES PATENTS

| Number | Name | Date |
| --- | --- | --- |
| 1,490,895 | Gerstenslager | Apr. 15, 1924 |
| 2,043,169 | Hawkinson | June 2, 1936 |
| 2,281,476 | Casey | Apr. 28, 1942 |
| 2,373,975 | Plumeau et al. | Apr. 17, 1945 |
| 2,469,723 | Greene | May 10, 1949 |

FOREIGN PATENTS

| Number | Country | Date |
| --- | --- | --- |
| 378,277 | Great Britain | Aug. 11, 1932 |